(12) United States Patent
Nozawa

(10) Patent No.: US 8,155,379 B2
(45) Date of Patent: Apr. 10, 2012

(54) AUTOMATIC REPRODUCTION METHOD AND APPARATUS

(75) Inventor: Kenji Nozawa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1234 days.

(21) Appl. No.: 11/878,221

(22) Filed: Jul. 23, 2007

(65) Prior Publication Data

US 2008/0025578 A1 Jan. 31, 2008

(30) Foreign Application Priority Data

Jul. 25, 2006 (JP) .................................. 2006-202521

(51) Int. Cl.
*G06K 9/00* (2006.01)
(52) U.S. Cl. ......................... 382/103; 382/118; 382/173
(58) Field of Classification Search ................... 382/118, 382/103, 173
See application file for complete search history.

(56) References Cited

U.S. PATENT DOCUMENTS

| 5,500,671 | A | * | 3/1996 | Andersson et al. | 348/14.1 |
| 5,973,691 | A | * | 10/1999 | Servan-Schreiber | 715/803 |
| 2005/0013599 | A1 | * | 1/2005 | Nakanishi et al. | 396/2 |
| 2005/0046730 | A1 | * | 3/2005 | Li | 348/333.12 |
| 2006/0061599 | A1 | * | 3/2006 | Yu et al. | 345/649 |
| 2006/0115185 | A1 | * | 6/2006 | Iida et al. | 382/305 |

FOREIGN PATENT DOCUMENTS

| EP | 1 558 015 A1 | 7/2005 |
| JP | 2001-346085 A | 12/2001 |
| JP | 2006-293782 A | 10/2002 |
| JP | 2003-319169 A | 11/2003 |
| JP | 2004-96486 A | 3/2004 |
| JP | 2005-182196 A | 7/2005 |
| JP | 2005-354333 A | 12/2005 |
| WO | WO 2004/036900 A1 | 4/2004 |

OTHER PUBLICATIONS

Explanation of circumstances concerning accelerated examination, submitted Sep. 14, 2010, in corresponding JP Application No. 2006-202521, 9 pages in English and Japanese.
Notice of Reasons for Rejection, dated Oct. 18, 2010, issued in corresponding JP Application No. 2006-202521, 6 pages in English and Japanese.

* cited by examiner

*Primary Examiner* — Aaron W Carter
(74) *Attorney, Agent, or Firm* — Sughrue Mion, PLLC

(57) ABSTRACT

The present invention provides an automatic reproduction method for automatically sequentially reproducing multiple original images, the method comprising the steps of: determining whether or not the original image to be automatically reproduced is an image including a face image of a person; if it is determined that the original image is an image including a face image of a person, cutting out the image of a face area including the face image from the original image; and adding face reproduction in which the cut out image of the face area is displayed in an enlarged state, to automatic reproduction of the original image.

11 Claims, 11 Drawing Sheets

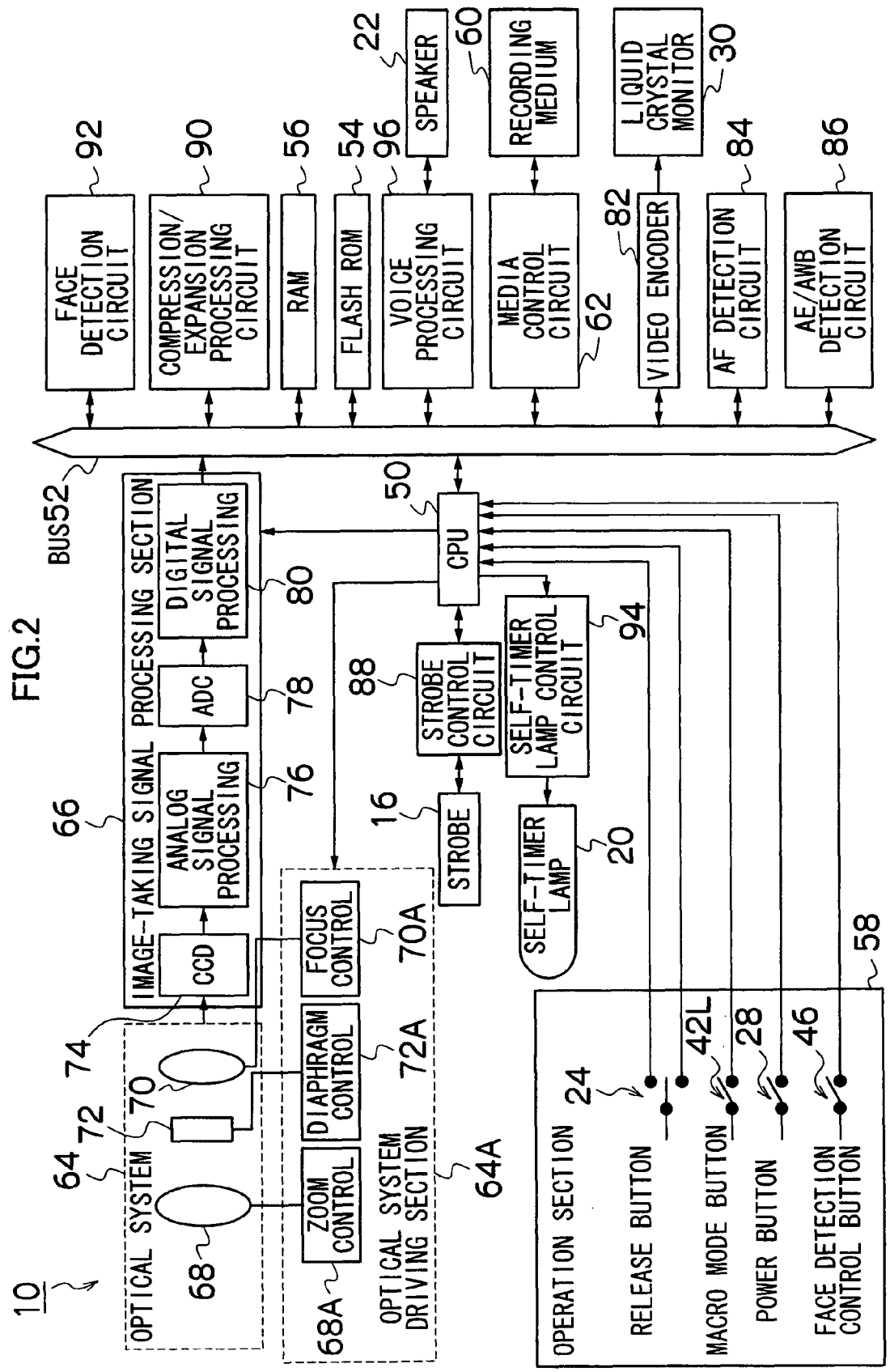

FIG.3

| FACE INFORMATION | FACE SIZE |
| --- | --- |
| | DEGREE OF POSSIBILITY OF BEING FACE (SCORE) |
| | FACE POSITION |
| | FACE INCLINATION ANGLE |

<AUTOMATIC FACE PLAY>

FIG.8
(1)
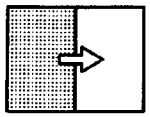
(2)
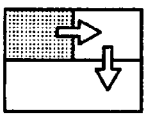
(3)
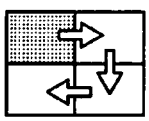

FIG.11
(1)
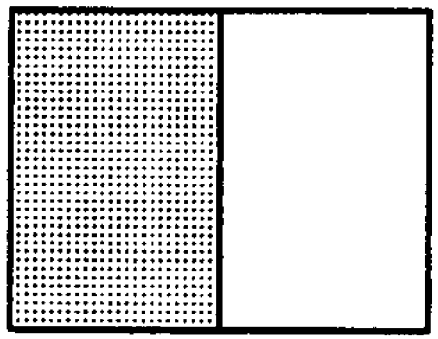
(2)
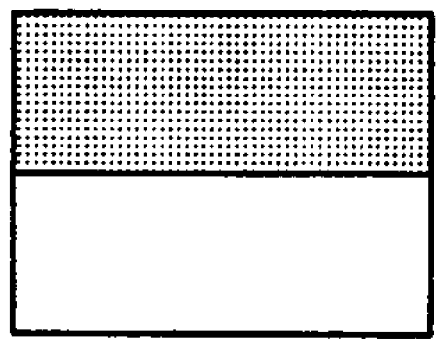

AUTOMATIC REPRODUCTION METHOD AND APPARATUS

BACKGROUND OF THE INVENTION

1. Field of the Invention

The present invention relates to an automatic reproduction method and apparatus, and in particular to an automatic reproduction method and apparatus in which multiple images are automatically sequentially reproduced.

2. Description of the Related Art

Digital cameras equipped with an autoplay function or an automatic multi-play function as a reproduction function have been known.

The autoplay function is a function of automatically sequentially reproducing multiple images recorded in a memory card at a predetermined interval.

The automatic multi-play function is a function of sequentially reading multiple images recorded in a memory card at a predetermined interval, cutting out an image from the read image (an original image) and arranging the cut out image on a divided area on a screen divided in two, three or four (a multi-screen) so that a user can enjoy the reproduction while updating the multi-screen.

There has been known a technique for identifying a head part, a bust part and the like in an image and performing trimming to obtain an image with an appropriate size (Japanese Patent Application Laid-Open No. 2004-96486).

SUMMARY OF THE INVENTION

A conventional autoplay function automatically reproduces images indiscriminately sequentially, irrespective of whether a person is included or not. For example, in order to display a person in an enlarged state to confirm the face expression, it is necessary to pause the autoplay and perform a zoom operation and the like. This is troublesome.

Furthermore, since the automatic multi-play function cuts out the image of a preset cutout area from an original image and arranges the cut out image in a divided area of the multi-screen, there is a problem that, if a person is included in the original image, such an image that the face of the person is cut may be reproduced.

The present invention has been made in consideration of the above situation, and its object is to provide an automatic reproduction method and apparatus which make it possible to, when performing the autoplay or the automatic multi-play of images including a person or persons, enjoy automatic reproduction paying attention mainly to the person or persons.

To achieve the above object, a first aspect of the present invention is an automatic reproduction method for automatically sequentially reproducing multiple original images, the method comprising the steps of: determining whether or not the original image to be automatically reproduced is an image including a face image of a person; if it is determined that the original image is an image including a face image of a person, cutting out the image of a face area including the face image from the original image; and adding face reproduction in which the cut out image of the face area is displayed in an enlarged state, to automatic reproduction of the original image.

That is, if an original image to be reproduced includes a face image of a person, face reproduction in which the image of a face area is cut out from the original image and displayed in an enlarged state is performed. Thereby, it is possible to confirm the face expression and the like and enjoy the automatic reproduction (autoplay). Reproduction of the face image may be performed after reproduction of the original image or may be performed before reproduction of the original image.

A second aspect is the automatic reproduction method according to the first aspect, wherein, if the original image is an image including face images of multiple persons, face reproduction in which the respective images of face areas including the face images are cut out from the original image and then the cut out images of the multiple face areas are sequentially displayed in an enlarged state is added to the automatic reproduction of the original image. Thereby, if multiple persons are included in an original image, it is possible to sequentially display the respective faces of the persons in an enlarged state, which increases the pleasure of watching pictures.

A third aspect is the automatic reproduction method according to the second aspect, wherein, at the time of performing the face reproduction in which the images of the multiple face areas are sequentially displayed in an enlarged state, the reproduction order is determined on the basis of at least one piece of information among the face image size, the degree of possibility of being a face and the face position. The autoplay can be enjoyed in a suitable order according to taken images. For example, in the case of a group picture of school students, the face images are sequentially displayed from the right on the basis of face position information. In the case of a picture including a lot of friends, the face images are displayed in order of face size.

A fourth aspect is the automatic reproduction method according to the second aspect, further comprising the step of selecting any information from among the face image size, the degree of possibility of being a face and the face position; wherein, at the time of performing the face reproduction in which the images of the multiple face areas are sequentially displayed in an enlarged state, the reproduction order is determined on the basis of the selected information. By selecting desired information from among the face image size, the degree of possibility of being a face and the face position, it is possible to change the reproduction order of multiple face images according to the selection result.

A fifth aspect is the automatic reproduction method according to any of the first to fourth aspects, further comprising the step of acquiring the inclination angle of the face image; wherein, at the time of performing the face reproduction in which the image of the cut out face area is displayed in an enlarged state, the image is rotated so that the face image is positioned in a normal direction, on the basis of the acquired inclination angle. Thereby, even in the case of a vertically long image, the face image can be displayed in a correct direction.

A sixth aspect of the present invention is an automatic reproduction method for automatically sequentially reproducing images cut out from multiple original images, wherein a multi-screen is updated by sequentially arranging the cut out images in multiple divided areas obtained by dividing the multi-screen, the method comprising the steps of: determining, when cutting out an image to be reproduced from the original image, whether or not the original image is an image including a face image of a person; if it is determined that the original image is an image including a face image of a person, cutting out the image of a face area including the face image from the original image, and, if it is determined that the original image is an image which does not include a face image of a person, cutting out the image of a predetermined area to be cut out; and arranging the cut out image in the divided area of the multi-screen.

If an original image includes a face image of a person, the image of a face area including the face image is cut out and arranged in a divided area of a multi-screen (enlarged display). Thereby, it is possible to solve the problem that an image with a cut face is reproduced on the multi-screen, and it is also possible to easily confirm the face expression.

A seventh aspect is the automatic reproduction method according to the sixth aspect, wherein, if the original image is an image including face images of multiple persons, the respective images of face areas including the face images are cut out from the original image and then the cut out images of the multiple face areas are sequentially arranged in the divided areas of the multi-screen.

An eighth aspect is the automatic reproduction method according to the seventh aspect, wherein, at the time of sequentially arranging the images of the multiple face areas in the divided areas of the multi-screen, the arrangement order is determined on the basis of at least one piece of information among the face image size, the degree of possibility of being a face and the face position.

A ninth aspect is the automatic reproduction method according to the seventh aspect, further comprising the step of selecting any information from among the face image size, the degree of possibility of being a face and the face position; wherein, at the time of sequentially arranging the images of the multiple face areas in the divided areas of the multi-screen, the arrangement order is determined on the basis of the selected information.

A tenth aspect is the automatic reproduction method according to any of the sixth to ninth aspects, further comprising the step of acquiring the inclination angle of the face image; wherein, at the time of arranging the cut out image of the face area in the divided area of the multi-screen, the image is rotated so that the face image is positioned in a normal direction, on the basis of the acquired inclination angle.

An eleventh aspect is the automatic reproduction method according to the tenth aspect, further comprising the step of determining whether the original image is a vertically long image taken by a camera turned sideways or a horizontally long image taken by a camera positioned erect, wherein, if the original image is a vertically long image, the image of a vertically long face area is cut out from the original image, and, if the original image is a horizontally long image, the image of a horizontally long face area is cut out from the original image; and the cut out image of the vertically long face area is arranged in a vertically long divided area of the multi-screen, and the cut out image of the horizontally long face area is arranged in a horizontally long divided area of the multi-screen.

Thereby, it is possible to arrange the image of a vertically long face area and the image of a horizontally long face area which have been cut out according to whether the original image is vertically or horizontally long, in a vertically long divided area and a horizontally long divided area of the multi-screen, respectively, and it is possible to cut out the image of a face area and display the multi-screen more appropriately.

A twelfth aspect of the present invention is an automatic reproduction apparatus for automatically sequentially reproducing multiple original images, the apparatus comprising: a reading device which reads an original image to be automatically reproduced from a storage device in which multiple original images are stored; a determination device which determines whether or not the read original image is an image including a face image of a person; a trimming device which, if it is determined that the original image is an image including a face image of a person, cuts out the image of a face area including the face image from the original image; an image display device; and a display control device which, if it is determined that the read original image is an image which does not include a face image of a person, causes the image display device to display only the original image, and, if it is determined that the read original image is an image including a face image of a person, causes the image display device to display the original image and display the image of the face area cut out from the original image in an enlarged state.

A thirteenth aspect is the automatic reproduction apparatus according to the twelfth aspect, wherein, if the original image is an image including face images of multiple persons, the trimming device cuts out the respective images of face areas including the face images; and the display control device causes the image display device to sequentially display the cut out images of the multiple face areas in an enlarged state.

A fourteenth aspect is the automatic reproduction apparatus according to the thirteenth aspect, wherein, at the time of causing the image display device to sequentially display the cut out images of the multiple face areas in an enlarged state, the display control device determines the reproduction order on the basis of at least one piece of information among the face image size, the degree of possibility of being a face and the face position.

A fifteenth aspect is the automatic reproduction apparatus according to the thirteenth aspect, further comprising a selection device which selects any information from among the face image size, the degree of possibility of being a face and the face position; wherein, when causing the image display device to sequentially display the cut out images of the multiple face areas in an enlarged state, the display control device determines the reproduction order on the basis of the information selected by the selection device.

A sixteenth aspect of the present invention is an automatic reproduction apparatus comprising a function of automatically sequentially reproducing images cut out from multiple original images, the function being an automatic multi-play function of updating a multi-screen by sequentially arranging the cut out images in multiple divided areas obtained by dividing the multi-screen, the apparatus comprising: a reading device which reads an original image to be automatically reproduced from a storage device in which multiple original images are stored; a determination device which determines whether or not the read original image is an image including a face image of a person; a trimming device which, if it is determined that the original image is an image including a face image of a person, cuts out the image of a face area including the face image from the original image, and, if it is determined that the original image is an image which does not include a face image of a person, cuts out the image of a predetermined area to be cut out; an image display device which displays the multi-screen; and an image update device which updates the multi-screen by arranging the images cut out by the trimming device in divided areas of the multi-screen.

A seventeenth aspect is the automatic reproduction method according to the sixteenth aspect, wherein, if the original image is an image including face images of multiple persons, the trimming device cuts out the respective images of face areas including the face images; and the image update device sequentially arranges the cut out images of the multiple face areas in the divided areas of the multi-screen.

An eighteenth aspect is the automatic reproduction method according to the seventeenth aspect, wherein, at the time of sequentially arranging the images of the multiple face areas cut out from the original image in the divided areas of the multi-screen, the image update device determines the arrangement order on the basis of at least one piece of information among the face image size, the degree of possibility of being a face and the face position.

A nineteenth aspect is the automatic reproduction method according to the seventeenth aspect, further comprising a selection device which selects any information from among the face image size, the degree of possibility of being a face and the face position; wherein, at the time of sequentially arranging the images of the multiple face areas cut out from the original image in the divided areas of the multi-screen, the image update device determines the arrangement order on the basis of the information selected by the selection device.

According to the present invention, if an original image to be reproduced includes a face image of a person, face reproduction in which the image of a face area is cut out from the original image and displayed in an enlarged state is performed together with reproduction of the original image. Thereby, it is possible to confirm the face expression and the like and enjoy the automatic reproduction without performing a special operation during the reproduction.

Furthermore, the image of a face area including a face image is cut out and arranged in a divided area of a multi-screen (enlarged display). Thereby, it is possible to avoid reproduction of an image with a cut face on the multi-screen, and it is also possible to easily confirm the face expression.

BRIEF DESCRIPTION OF THE DRAWINGS

FIG. 2 is a block diagram showing the internal configuration of the digital camera shown in FIGS. 1A and 1B;

FIG. 3 shows an example face information to be recorded in a tag of image file;

FIG. 8 shows an example of multi-screens to be sequentially displayed during the automatic multi-play;

FIG. 11 shows other examples of the layout rule of the automatic multi-play.

DETAILED DESCRIPTION OF THE PREFERRED EMBODIMENTS

An embodiment of an automatic reproduction method and apparatus according to the present invention will be described below with reference to accompanying drawings.

[External Configuration of a Digital Camera to which the Present Invention is Applied]

Figure 1B:
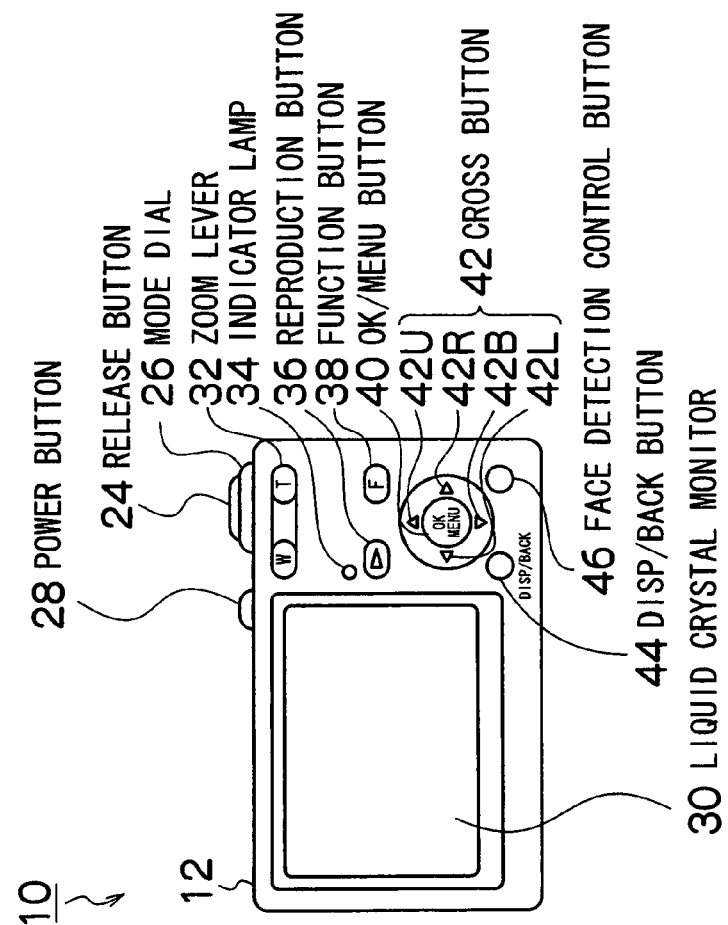
FIGS. 1A and 1B show the external view of a digital camera to which an automatic reproduction apparatus according to the present invention is applied.
Figure 1A:
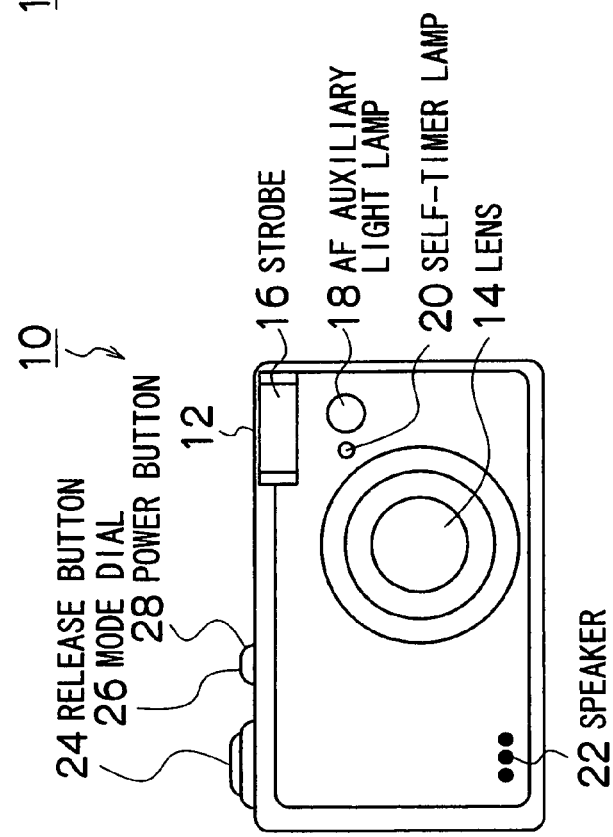

FIG. 1A shows the external view of the front of the digital camera to which an automatic reproduction apparatus according to the present invention is applied, and FIG. 1B shows the external view of the back thereof.

The digital camera 10 is provided with still-image/movie recording and reproduction functions. The camera body 12 of the digital camera 10 is formed in a flat and rectangle box shape. As shown in FIG. 1A, there are provided an image-taking lens 14, a strobe 16, an AF auxiliary light lamp 18, a self-timer lamp 20 and a speaker 22 on the front of the camera body 12, and there are provided a release button 24, a mode dial 26 and a power button 28 on the upper surface. As shown in FIG. 1B, there are provided a liquid crystal monitor 30, a zoom lever 32, an indicator lamp 34, a reproduction button 36, a function button 38, an OK/MENU button 40, a cross button 42, a DISP/BACK button 44 and a face detection control button 46 on the back of the camera body 12.

The power button 28 functions as a button for turning on/off the power source of the digital camera 10.

The image-taking lens 14 consists of a retractable zoom lens, and it is pulled out of the front of the camera body 12 by turning on the power of the image-taking apparatus 10. It is retracted into the camera body 12 by turning off the power of the image-taking apparatus 10.

The release button 24 consists of a two-stage stroke type button which enables so-called "half press" and "full press". The "half press" causes AF (auto focus) and AE (auto exposure) to function, and the "full press" causes image taking to be executed.

The liquid crystal monitor 30 provided on the back of the camera body 12 is used as a monitor for reproducing a taken image as well as being used as an electronic view finder during image taking. The DISP/BACK button 44 functions as a button for switching on/off of this electronic view finder. The liquid crystal monitor 30 is also used as a display screen as a user interface, and information such as menu information, selection items and contents of settings is displayed as necessary. It is also possible to use a display of a different type, such as an organic EL (electro-luminescence), instead of the liquid crystal monitor 30.

The image-taking apparatus 10 has two operation modes: an image-taking mode for taking an image and a reproduction mode for reproducing the image. The reproduction button 36 functions as a button for switching from the image-taking mode to the reproduction mode. By pressing the reproduction button 36 during the image-taking mode, the operation mode is switched from the image-taking mode to the reproduction mode. Switching from the reproduction mode to the image-taking mode is performed by half-pressing the release button 24 during the reproduction mode.

The indicator lamp 34 functions as a lamp for indicating the operation state of the camera (for example, the state of AF being locked, the state of an image being recorded and the state of electricity being charged).

The mode dial 26 functions as a switch for switching among the image-taking modes of the image-taking apparatus 10. According to the position where the mode dial 26 is set, the mode is switched to a scene position mode for performing image taking by optimizing focus and exposure depending on the scene position (whether the image taking is intended to take, for example, a natural photograph, a person, scenery, sports, a night view, an underwater photograph, a close-up photograph (of a flower and the like) or a text sentence), an automatic image-taking mode for automatically setting focus and exposure, a manual image-taking mode enabling manual setting of focus and exposure or a movie shooting mode.

The zoom lever 32 consists of a seesaw button which is supported in the middle so that it can be pressed down at the right or the left, and it functions as an operation button for performing a zoom operation. That is, by pressing down this zoom lever 32 at the right under the image-taking mode, a tele-direction zoom operation is performed; and by pressing it down at the left, a wide-direction zoom operation is performed. Furthermore, by pressing the zoom lever 32 at the right under the reproduction mode, a reproduced image is displayed in an enlarged state; and by pressing it at the left, a reproduced image is displayed in a reduced state.

The OK/MENU button 40 functions as a button for instructing display of a menu screen. By pressing this OK/MENU button 40, the menu screen is displayed on the liquid crystal monitor 30. The OK/MENU button 40 also functions as a button for instructing decision of an item selected from the menu screen or execution of an operation. The DISP/BACK button 44 functions as a button for instructing cancellation of selection of an item from the menu screen or return to the previous state.

As shown in FIG. 1B, the cross button 42 is a seesaw button which is supported in the middle so that it can be pressed down at the top, the bottom, the right or the left, and it is formed to surround the OK/MENU button 40. The cross button 42 is constituted by an upper button 42U, a lower button 42B, a left button 42L and a right button 42R and functions as a cursor shift key for selecting a reproduced through movie image during the reproduction mode or moving a cursor which indicates selection of an item on the menu screen. That is, under the reproduction mode, the left button 42L functions as a frame return button (a button for instructing the image of the immediately previous frame to be displayed), and the right button 42R functions as a frame advance button (a button for instructing the image of the immediately following frame to be displayed).

The left button 42L functions as a macro mode button for switching on/off of a macro function (close-up image-taking function) under the still-image taking mode or a movie shooting mode. By pressing the left button 42L, the macro function is turned on or off.

The right button 42R functions as a button for switching the flash mode under the still-image taking mode or the movie shooting mode. By pressing the right button 42R, the flash mode is set to a flash on mode or flash off mode.

The upper button 42U functions as a single frame deletion button for deleting the image of one frame under the reproduction mode.

The lower button 42B functions as a button for setting conditions for self-timer image taking. Each time the lower button 42B is pressed under the image-taking mode, the self timer is switched between on and off.

The function button 38 functions as a button for setting the number of recorded pixels, image-taking sensitivity and color tone under the image-taking mode and functions as a button for setting print reservation under the reproduction mode.

The face detection control button 46 functions as a button for setting on/off of face detection under the image-taking mode and functions as a button for selecting a face in an image during preview display of a taken image or under the reproduction mode.

[Internal Configuration of the Image-taking Apparatus 10]

FIG. 2 is a block diagram showing the internal configuration of the image-taking apparatus 10. As shown in FIG. 2, the image-taking apparatus 10 is provided with a central processing unit (CPU) 50. The CPU 50 performs overall control of the operation of the entire image-taking apparatus 10. The CPU 50 functions as a control device which controls this camera system in accordance with a predetermined program and functions as a computation device which performs various computations such as auto exposure (AE) computation, auto focus (AF) adjustment computation and white balance (WB) adjustment computation.

A flash ROM (flash read-only memory) 54 is connected to the CPU 50 via a bus 52. In the flash ROM 54, there are stored programs to be executed by the CPU 50, various data required for control and the like as well as CCD pixel defect information and various constants/information related to the operations of the camera.

A RAM (random-access memory) 56 is used as an area for development of a program and an area for computation work by the CPU 50, and it is also used as a temporary storage area for image data and voice data. The RAM 56 is also used as a VRAM (video random-access memory), which is a temporary storage memory dedicated for image data, and it includes an A area and a B area.

An operation section 58 includes various operation switches such as the release button 24, the mode dial 26, the power button 28, the zoom lever 32, the indicator lamp 34, the reproduction button 36, the function button 38, the OK/MENU button 40, the cross button 42, the DISP/BACK button 44 and the face detection control button 46 described above. In FIG. 2, the operation switches other than the release button 24, the macro mode button 42L, the power button 28 and the face detection control button 46 are omitted in FIG. 2. Signals from these various operation switches are inputted to the CPU 50. The CPU 50 controls each circuit of the image-taking apparatus 10 based on the input signals and performs, for example, lens driving control, image-taking operation control, image processing control, image data recording/reproduction control, display control of the liquid crystal monitor 30 and the like.

The image-taking apparatus 10 has a media socket (a medium attaching section) not shown, and a recording medium 60 can be attached to the media socket. The type of the recording medium 60 is not especially limited, and various media can be used, such as a semiconductor memory card represented by xD Picture Card (registered trade mark) and Smart Media™, a portable small-sized hard disk, a magnetic disk, an optical disk and a magneto-optical disk. A media control circuit 62 performs required signal conversion to transfer an input/output signal suitable for the recording medium 60.

The image-taking apparatus 10 is provided with an external connection interface section as a communication device which connects to an external device such as a personal computer. By connecting the image-taking apparatus 10 to the external device with a USB cable or the like not shown, the image-taking apparatus 10 can exchange data with the external device. Of course, the communication method is not limited to the USB method. Other communication methods such as IEEE1394 and Bluetooth™ may be applied.

[Image-taking Mode]

Next, the image-taking function of the image-taking apparatus 10 will be described. Under the image-taking mode, power is supplied to an image-taking signal processing section 66 which includes an optical system 64, an optical system driving section 64A and a color CCD image sensor (hereinafter referred to as a CCD 74), and thereby image taking is enabled.

The optical system 64 is an optical unit which includes an image-taking lens including a zoom lens 68 and a focus lens 70, and a mechanical shutter 72 which is also used as a diaphragm. Zooming of the image-taking lens is performed by a zoom control section 68A causing the zoom lens 68 to move, and focusing is performed by a focus control section 70A causing the focus lens 70 to move. The CPU 50 outputs a control signal to the zoom control section 68A and the focus control section 70A to perform control.

The diaphragm 72 consists of a so-called turret diaphragm, and the diaphragm value (F value) is changed by rotating a turret plate in which diaphragm holes ranging from F2.8 to F8 are made. The diaphragm 72 is driven by a diaphragm control section 72A. The CPU 50 outputs a control signal to this diaphragm control section 72A to perform control.

The optical system driving section 64A has a device which drives the optical system 64 or the CCD 74 to perform camera shake compensation.

From light passing through the optical system 64, an image is formed on the light receiving surface of the CCD 74 of the image-taking signal processing section 66. On the light receiving surface of the CCD 74, a lot of photodiodes (light receiving elements) are two-dimensionally arrayed. For each photodiode, primary color filters in red (R), green (G) and blue (B) are arranged in a predetermined array structure. The CCD 74 has an electronic shutter function of controlling the charge accumulation time (shutter speed) of each photodiode. The CPU 50 controls the charge accumulation time for the CCD 74 via a timing generator (TG) not shown. Furthermore, the CPU 50 controls the OFD (overflow drain) potential of the CCD 74 to adjust the upper limit of signal charge accumulated in the photodiodes constituting the CCD 74.

The subject image formed on the light receiving surface of the CCD 74 is converted to an amount of signal charge corresponding to the amount of the incident light by each photodiode. The signal charge accumulated in each photodiode is sequentially read as a voltage signal (an image signal) corresponding to the signal charge, based on a driving pulse given by TG (such as a reading pulse, a vertical transfer clock and a horizontal transfer clock) in accordance with an instruction by the CPU 50.

The signal outputted from the CCD 74 is sent to an analog signal processing section (CDS/AMP) 76. For the R, G and B signals for each pixel, sampling/hold processing (correlation double sampling processing) is performed by the analog signal processing section 76 in order to amplify them, and then they are added to an A/D converter (ADC) 78. The point sequential R, G and B signals which have been converted to digital signals by the A/D converter 78 are added to a digital signal processing section 80.

The digital signal processing section 80 functions as an image processing device which includes a white balance adjustment circuit, a gamma correction circuit, a synchronization circuit (a processing circuit for interpolating the spatial gap among the color signals caused due to the array of the color filters of a single-plate CCD to convert the color signals to synchronous signals), an outline correction circuit, a brightness/color difference signal generation circuit and the like. It performs predetermined signal processing by utilizing the RAM 56 in accordance with commands from the CPU 50. That is, the RGB image data inputted to the digital signal processing section 80 are converted to brightness signals (Y signals) and color difference signals (Cr and Cb signals), and predetermined processings such as gamma correction is performed for the signals. The image data processed by the digital signal processing section 80 is stored in the RAM 56.

In the case of outputting a taken image to the liquid crystal monitor 30, the image data is read from the RAM 56 and sent to a video encoder 82 via the bus 52. The video encoder 82 converts the inputted image data to a video signal in a predetermined method for display (for example, a color compound image signal in the NTSC method) and outputs it to the liquid crystal monitor 30.

Image data corresponding to an image of one frame is overwritten alternately on the A and B areas of the RAM 56, by an image signal outputted from the CCD 74. From the area A or B of the RAM 56, on which image data is not being overwritten, the image data written there is read. By periodically overwriting the image data in the RAM 56 in this way and supplying an image signal generated from the image data to the liquid crystal monitor 30, a movie being shot is displayed on the liquid crystal monitor 30 in real time. A photographer can confirm the image-taking angle of view from the movie (through movie image) displayed on the liquid crystal monitor 30.

When the image-taking switch is half-pressed and S1 is on, the image-taking apparatus 10 starts AE and AF processings. That is, an image signal outputted from the CCD 74 is A/D converted, and then they are inputted to an AF detection circuit 84 and an AE/AWB detection circuit 86 via the bus 52.

The AE/AWB detection circuit 86 includes a circuit which divides one screen into multiple divided areas (for example, 8×8 or 16×16 areas) and integrates RGB signals for each of the divided areas, and the integrated value is provided to the CPU 50. The CPU 50 detects the brightness of a subject (subject brightness) on the basis of the integrated value obtained from the AE/AWB detection circuit 86 and calculates an exposure value (an image-taking EV value) suitable for image taking. The CPU 50 determines a diaphragm value and a shutter speed on the basis of the obtained exposure value and a predetermined program line diagram. It controls the electronic shutter and the iris of the CCD 74 based on the diaphragm value and the shutter speed to obtain an appropriate amount of exposure.

Furthermore, the CPU 50 sends a command to a strobe control circuit 88 as necessary. The strobe control circuit 88 performs charge control of a main capacitor not shown, electric discharge (light emission) timing control of the strobe emission section (a xenon tube, a light emitting diode or the like) 16.

The AE/AWB detection circuit 86 calculates, for each divided area, an average integrated value for each color of the RGB signals when automatic white balance adjustment is performed, and it provides the result of the calculation to the CPU 50. Obtaining the integrated values of R, B and G, the CPU 50 determines the ratios of R/G and B/G for each divided area and determines the kind of light source, based on distribution of these R/G and B/G values in a color space with R/G and B/G axes coordinates. Then, it controls gain values for the R, G and B signals in the white balance adjustment circuit (white balance gain) according to the determined kind of light source to correct the signal of each color channel.

As the AF control in the image-taking apparatus 10, for example, contrast AF in which the focus lens 70 is moved so that the high-frequency component of the G signal in an image signal becomes the maximum is applied. The AF detection circuit 84 is configured by a high-pass filter which allows only the high-frequency component of the G signal to pass, a conversion-to-absolute-value processing section, an AF area extraction section for cutting out a signal from within an area to be targeted by focusing, which is preset within the screen (for example, at the center of the screen), and an integration section which integrates absolute value data within the AF area.

The data of the integrated value determined by the AF detection circuit 84 is notified to the CPU 50. While controlling the focus control section 70A to move the focus lens 70, the CPU 50 computes a focus evaluation value (AF evaluation value) at multiple AF detection points and determines such a lens position that the evaluation value becomes the maximum as the focused position. Then, the CPU 50 controls the focus control section 70A to move the focus lens 70 to the determined focused position. The computation of the AF evaluation value is not limited to the aspect of using the G signal. The brightness signal (Y signal) may be used.

While the AF control is performed, photometry is performed by the CCD 74. In the case where the photometric value is equal to or below a predetermined value, the AF auxiliary light lamp 18 lights up.

When the image-taking switch is half-pressed, S1 is on and AE/AF processing is performed. When the image-taking switching is fully pressed, S2 is on and an image-taking operation for recording starts. Image data acquired in response to S2 being turned on is converted to a brightness/color difference signal (a Y/C signal) by the digital signal processing section 80, and then stored in the RAM 56 after predetermined processings such as gamma correction are performed therefor.

The Y/C signal stored in the RAM 56 is compressed by a compression/expansion processing circuit 90 in accordance with a predetermined format and recorded in the recording medium 60 via the media control circuit 62. For example, a still image is recorded as an image file in the JPEG (Joint Photographic Experts Group) format.

A self-timer lamp control circuit 94 informs a photographer of execution and end of image taking and the like by lighting up, blinking or extinguishing the self-timer lamp 20 when self-timer image taking is performed.

A face detection circuit 92 operates when the face detection control button 46 is on to specify the face image taking mode. It detects the face of a subject person from a taken image. The following is an example of a method for the face detection processing. Correlation with a face image template is examined by moving the largest target area for detecting a preset face area, within the screen little by little to calculate the degree of possibility of being a face (a correlation score), and, when the correlation score exceeds a preset threshold, the target area is recognized to be a face image. Then, the target area is reduced a little, and the correlation with the face image template is examined again. This is repeated until the smallest detection area is targeted in order to detect a face. As the face detection method, well-known methods can be used, such as a face detection method using edge detection or shape pattern detection and a face detection method using hue detection or skin color detection.

Furthermore, the face detection circuit 92 detects the size of the detected face (for example, the vertical and horizontal sizes of a face frame surrounding the face), the position of the face (the coordinate values of two opposite points on the face frame surrounding the face or the coordinate values of the center of the face), the inclination angle of the face and the like. The inclination angle of the face can be determined by detecting an angle formed by the line between the right and left eyes and one side of the image. It is also possible to detect only information indicating the direction of the top/bottom of the face.

The information indicating the degree of possibility of being a face (correlation score), the face size, the face position and the face inclination angle detected by the face detection circuit 92 is provided for the CPU 50.

The CPU 50 displays a face frame around the face image in the image displayed on the liquid crystal monitor 30 on the basis of the information sent from the face detection circuit 92 during the face image taking mode specified by the face detection control button 46 being turned on. When a taken still image is recorded, the CPU 50 records the face information shown in FIG. 3 as additional information in a tag of the image file.

When an image includes multiple faces, the face detection circuit 92 detects each of the faces and outputs information about the multiple faces to the CPU 50. The CPU 50 records the information about the multiple faces in a tag of the image file.

[Reproduction Mode]

Under the reproduction mode, the compressed data of the last image file recorded in the recording medium 60 (the image file recorded last) is read out. If the image file recorded last is a still image file, the compressed image data read out is expanded to an uncompressed YC signal via the compression/expansion processing circuit 90, converted to a signal for display via the digital signal processing section 80 and the video encoder 82 and then outputted to the liquid crystal monitor 30. Consequently, the contents of the image of the image file are displayed on the screen of the liquid crystal monitor 30.

By operating the right or left button of the cross button 42 during reproduction of one frame of a still image (including reproduction of the top frame of a movie), switching of the image files to be reproduced (forward/backward frame advance) can be performed. The image file at the position specified by the frame advance is read from the recording medium 60, and the still image or the movie is reproduced and displayed on the liquid crystal monitor 30 the same as described above.

If, under the reproduction mode, an external display such as that of a personal computer or a TV is connected to the digital camera 10 via the external connection interface section, the image file recorded in the recording medium 60 is processed by the video encoder 82 and reproduced and displayed on this external display.

A voice processing circuit 96 outputs a voice signal to the speaker 22 when a voice file or an image accompanied by voice is reproduced.

[Autoplay]

Next, automatic reproduction (autoplay) according to the present invention will be described.

By setting the digital camera 10 to the reproduction mode and pressing the function button 38, a menu screen (not shown) is displayed on the liquid crystal monitor 30, and "autoplay" can be selected on this menu screen.

Figure 4:
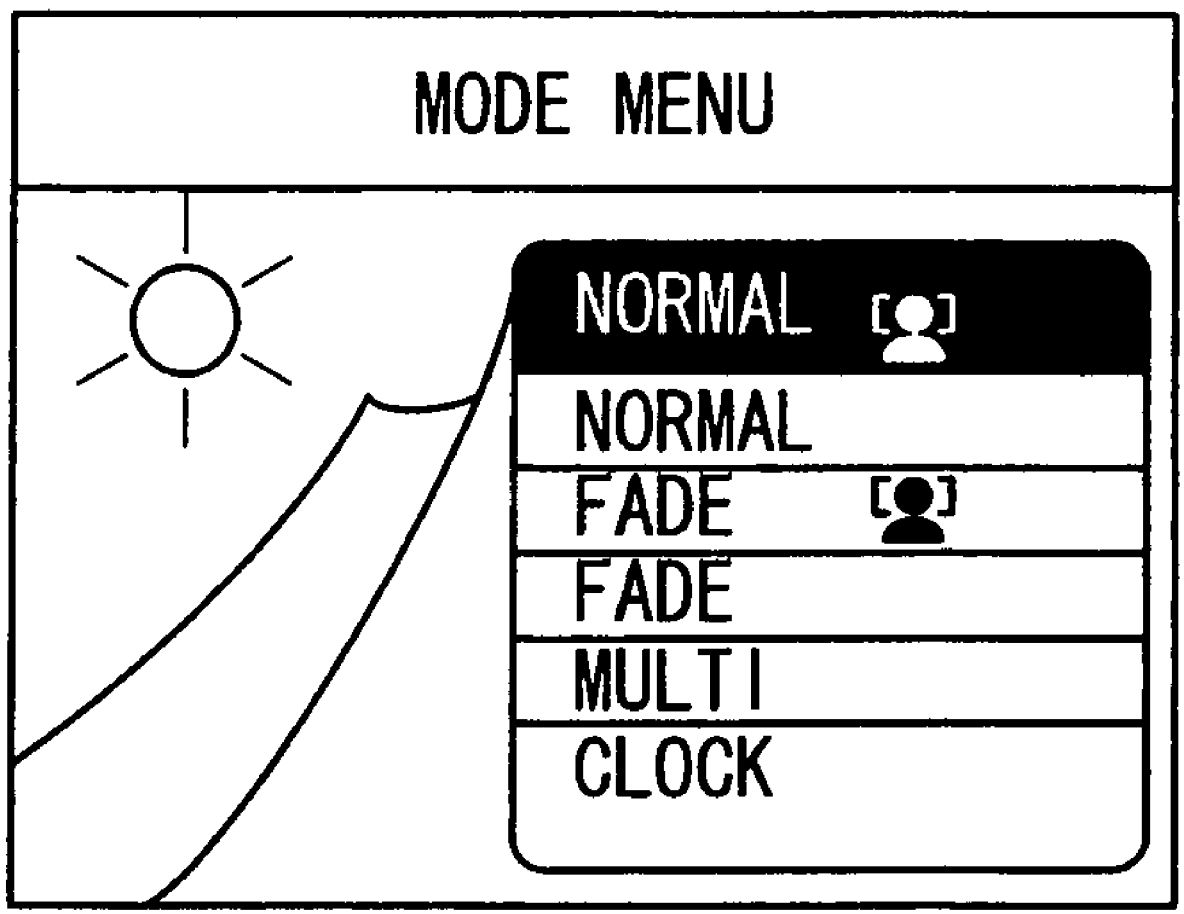
FIG. 4 shows an "autoplay" mode menu to be displayed on a liquid crystal monitor of the digital camera.

When "autoplay" is selected, an "autoplay" mode menu is displayed on the liquid crystal monitor 30 as shown in FIG. 4.

On this mode menu, face autoplay "normal", autoplay, "normal", face autoplay "fade", autoplay "fade", face autoplay "multi" and "clock" are displayed, and any of them can be selected. A face icon is displayed for the face autoplay to distinguish the face autoplay from the normal autoplay. The "clock" is selected to set an interval among images to be sequential reproduced while the autoplay is performed.

Here, under the normal autoplay, only original images recorded in the recording medium 60 are sequentially reproduced. Under the face autoplay, the original images recorded in the recording medium 60 are sequentially reproduced, and face reproduction in which the image of a face area is displayed in an enlarged state is also performed, as described later.

The "normal" and the "fade" are different in the manner of switching images (transition among images). Under the "normal", images are instantaneously switched. Under the "fade", images are switched by fade-in/fade-out.

Under the "multi", the original images recorded in the recording medium 60 are reproduced in a display pattern similar to that used in conventional automatic multi-play. However, the "multi" is different from the conventional automatic multi-play in that, if the original image includes a face image of a person, the image of a face area including the face image is cut out from the original image and reproduced as described later.

<Automatic Face Play>

Figure 5:
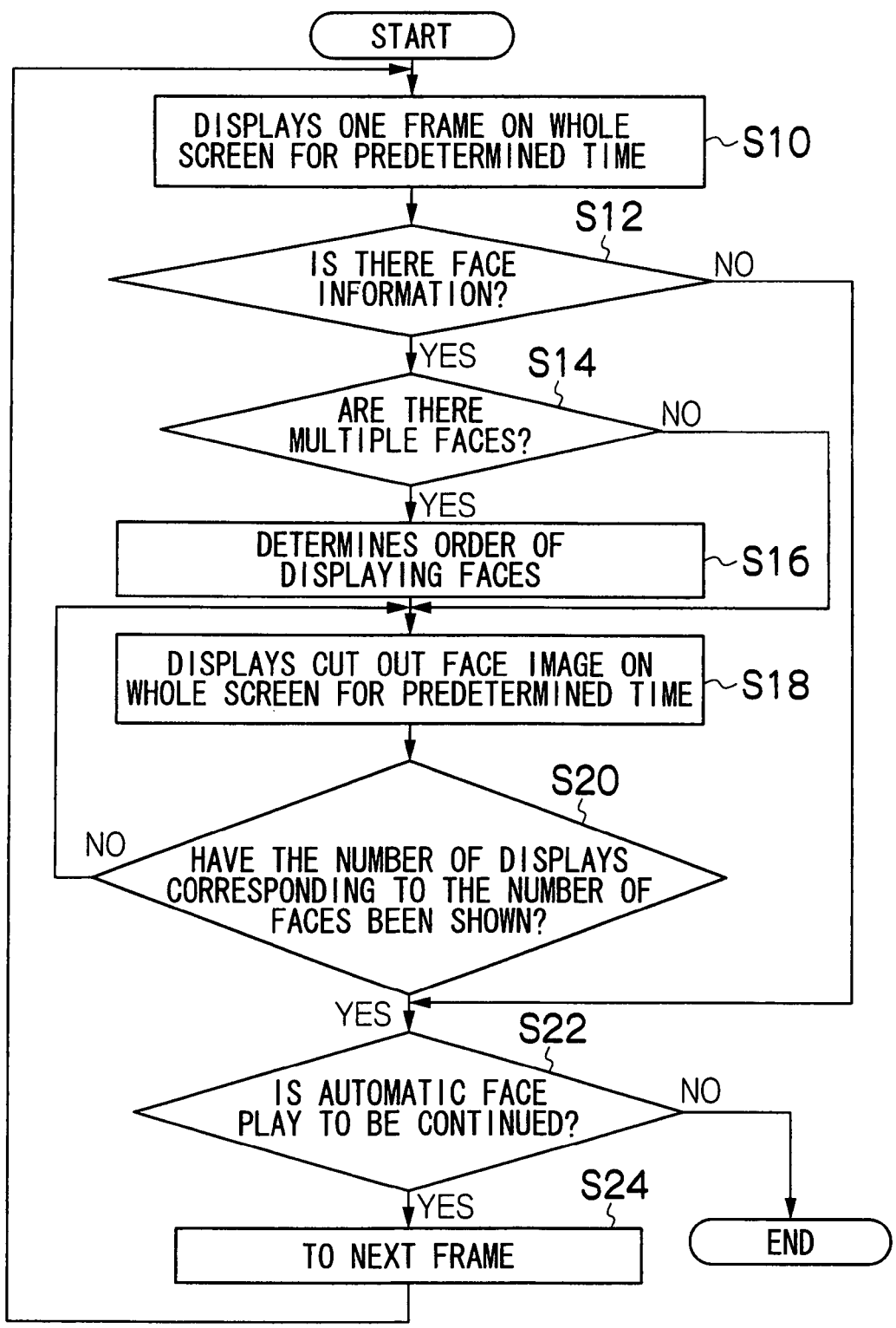
FIG. 5 is a flowchart showing a reproduction operation performed when automatic face play is selected.
Figure 6:
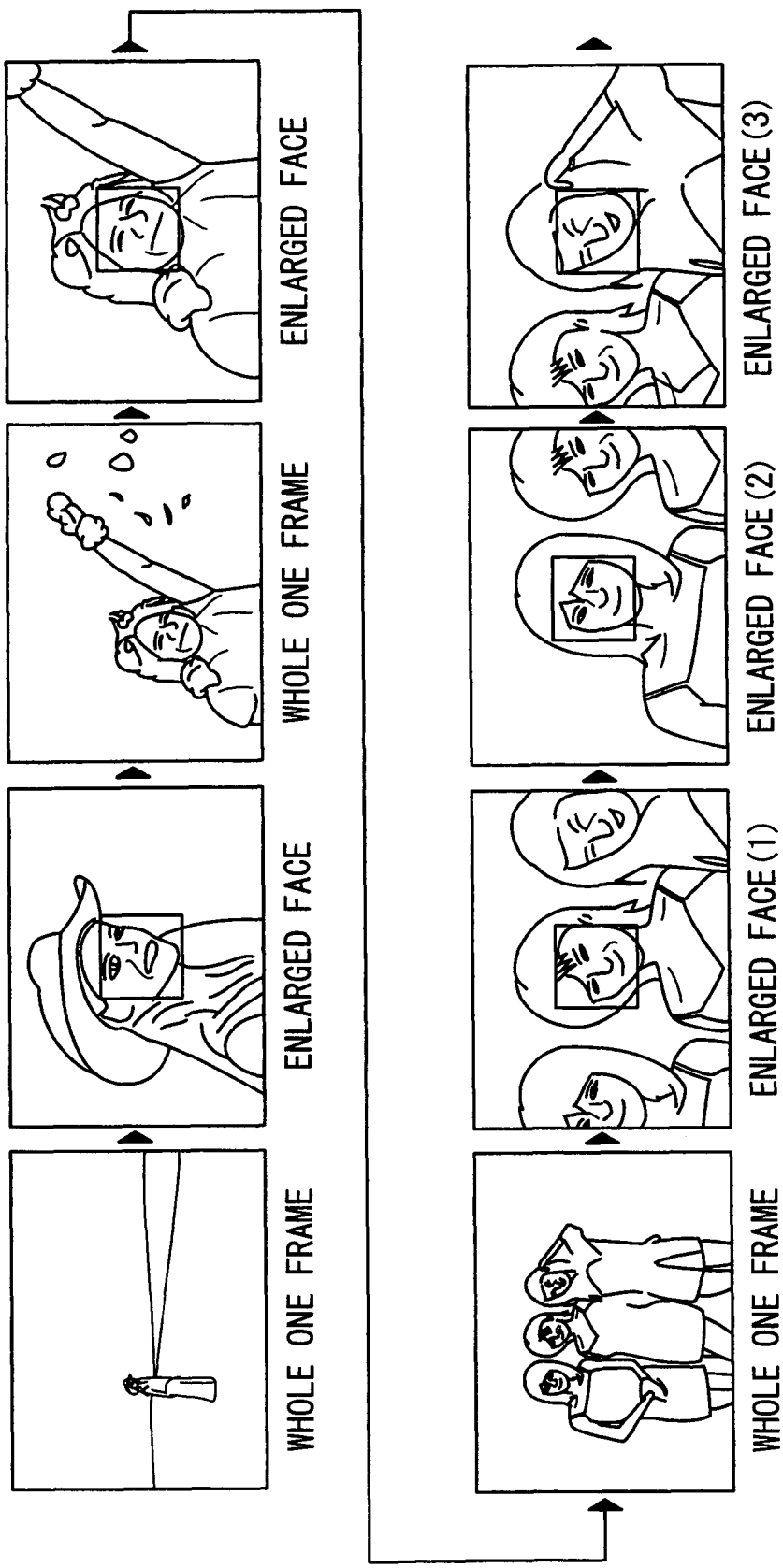
FIG. 6 shows an example of images sequentially displayed during the automatic face play.

FIG. 5 is a flowchart showing a reproduction operation performed when the automatic face play is selected, and FIG. 6 shows an example of images sequentially displayed during the automatic face play. In FIG. 6, a face frame is displayed in frames where a face is reproduced in an enlarged state. This face frame is displayed only when the face detection control button 46 is on.

In FIG. 5, an image with the oldest image-taking time and date from a group of images recorded in the recording medium 60. The read image of one frame (original image) is displayed on the whole screen of the liquid crystal monitor 30 for a predetermined period of time (step S110).

Then, it is determined whether or not face information is recorded in a tag of the image file of the original image displayed currently (step S12). If face information is not recorded, the image is not an image taken in the face image-taking mode (the image is an image taken when the face detection control button 46 is off). Therefore, the flow jumps to step S22.

On the other hand, if face information is recorded, the image is an image taken in the face image-taking mode (the image is an image taken when the face detection control button 46 is on). Therefore, the flow proceeds to step S14, where it is determined whether or not there are multiple faces (that is, whether or not multiple pieces of face information are recorded in a tag of the image file).

If there are multiple faces, the order of displaying the multiple faces is determined (step S16). The determination of the display order is performed on the basis of the face size, the degree of possibility of being a face (score) or the face position included in the face information shown in FIG. 3. For example, in the case of determining the display order on the basis of the face size, the faces are displayed in descending order of the face size. According to this order, the face of a person positioned at the front is displayed first. In the case of determining the display order on the basis of the degree of possibility of being a face, the faces are displayed in descending order of the score. According to this order, the face of a person looking forward is displayed prior to the face of a person looking aside because the score of the former is higher than the score of the latter. In the case of determining the display order on the basis of the face position, the display order is determined, for example, in a manner that the faces are sequentially displayed from the right (upper) face to the left (lower) face. This display order is especially suitable for a group photograph. In the case of a picture in which three persons line up, the faces may be displayed in the order of middle, left and right on the basis of the face positions.

The user can select which information, among the face image size, the degree of possibility of being a face (score) and the face position information, is to be based on to determine the display order, with the use of the menu screen or the like as necessary. The display order suitable for images may be automatically determined with the use of the face image size, the degree of possibility of being a face (score) or the face position.

At step S118, the image of a face area including a face image is cut out, and the image of the face area is displayed in an enlarged state on the whole screen of the liquid crystal monitor 30 for a predetermined period of time. For example, an area twice or three times as large as the face image in the face frame area is cut out as a face area, and the cut out image is enlarged so that it is displayed on the whole screen of the liquid crystal monitor 30. Furthermore, when the image of the face area is cut out and displayed in an enlarged state, the image is rotated so that the face image is positioned in a normal direction, on the basis of the inclination angle of the face included in the face information.

Then, it is determined whether or not the number of displays corresponding to the number of faces (including one face) existing in the one frame have been shown (step S20). If the number of displays corresponding to the number of faces have not been shown yet, the flow returns to step S18, where the image of a face area including the next face image is cut out in accordance with the display order and displayed in an enlarged state for a predetermined period of time. If the number of displays corresponding to the number of faces have been shown, the flow proceeds to step S22.

At step S22, the operation of the DISP/BACK button 44 is monitored to determine whether or not to continue the automatic face play. That is, if the DISP/BACK button 44 is on during the automatic face play, the automatic face play is ended.

If the automatic face play continues, the next frame (an image with an image-taking time and date later than that of the image being reproduced currently) is set to be an image to be automatically reproduced, and the flow returns to step S10 (step S24). If the image being reproduced currently is the image with the latest image-taking time and date, the image with the oldest image-taking time and date is set to be the image to be reproduced next.

As shown in FIG. 6, by the automatic face play processing operation described above, an original image (the whole one frame) is displayed on the liquid crystal monitor 30 similarly to the case of the normal autoplay, and, in the case of an original image in which face information is recorded, the image of a face area cut out from the original image is displayed in an enlarged state after the original image is displayed. As shown in FIG. 6, in the case where multiple (three) face images exist in an original image, the respective images of the face areas cut out from the original image are sequentially displayed in an enlarged state (enlarged face (1)→enlarged face (2)→enlarged face (3)).

<Automatic Multi-play>

Figure 7:
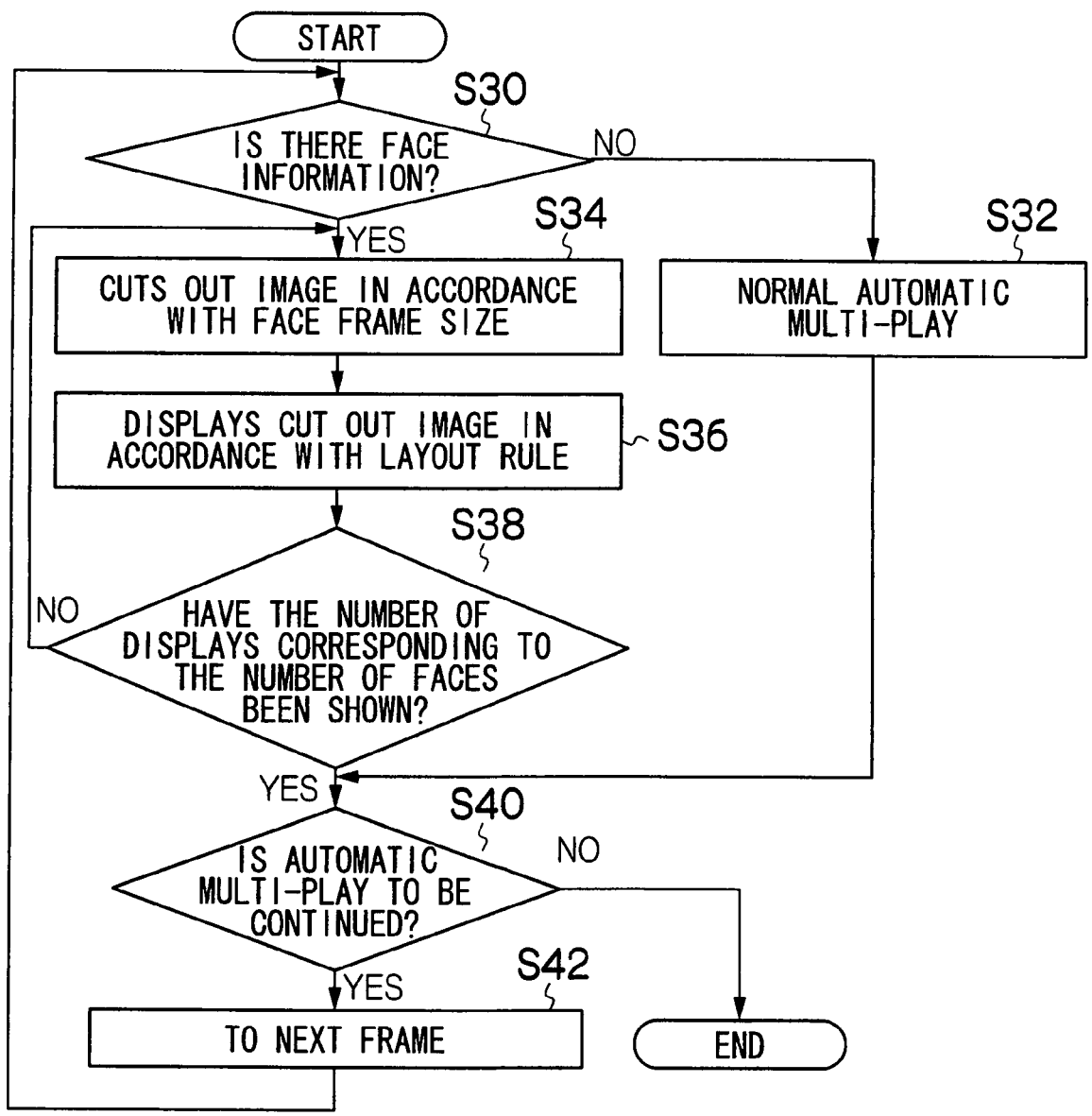
FIG. 7 is a flowchart showing a reproduction operation performed when automatic multi-play is selected.

FIG. 7 is a flowchart showing a reproduction operation performed when the automatic multi-play is selected, and FIG. 8 shows an example of multi-screens to be sequentially displayed during the automatic multi-play. Though a face frame is displayed on the multi-screen in FIG. 8, the face frame is not displayed actually.

In FIG. 7, an image (original image) with the oldest image-taking time and date is read from a group of images recorded in the recording medium 60 first, and it is determined whether face information is recorded in a tag of the image file of this original image (step S30). If the face information is not recorded, automatic reproduction is performed by the normal automatic multi-play (step S32).

An example of a display pattern of the automatic multi-play will be described.

Figure 9:
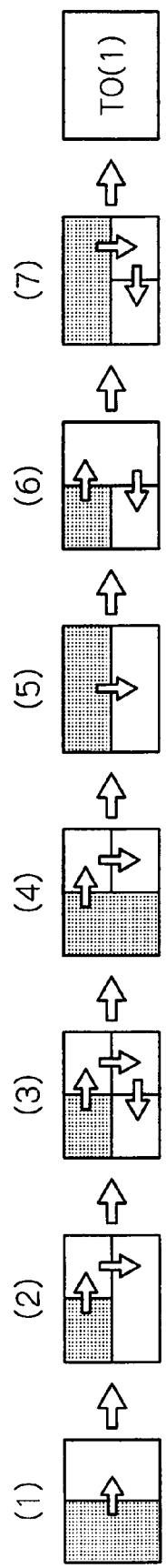
FIG. 9 shows an example of the layout rule of the automatic multi-play.

As shown in FIG. 9, multiple kinds of multi-screens (1) to (7) in which the screen is divided in two, three or four are prepared to cause the multi-screen to transition in the order of the multi-screen (1)→(2)→ . . . →(7)→(1)→. On each multi-screen, images cut out from an original image are arranged in the areas divided in two, three or four in the order indicated by arrows.

For example, on the multi-screen (1), an image A is arranged in the divided area on the left first, and then an image B is arranged in the divided area on the right. Subsequently, the screen transitions to the multi-screen (2), and an image C is arranged in the divided area at the upper left of this multi-screen (2), and the upper half of the image A is replaced with the image C.

Next, an image D is arranged in the area at the upper right of the multi-screen (2), and the upper half of the image B is replaced with the image D. Subsequently, an image E is arranged in the lower area of the multi-screen (2), and the lower halves of the images A and B are replaced with the image E.

Similarly, images are sequentially arranged in the divided areas of the multi-screen in accordance with the layout rule shown in FIG. 9 to update the multi-screen.

Figure 10A:
FIGS. 10A to 10C show the range of cutout from an original image.

Returning to FIG. 7, in the automatic reproduction by the normal automatic multi-play at step S32, the image of a preset cutout area is cut out from the original image as shown in FIG. 10A, and the cut out image is arranged in a divided area of the multi-screen in accordance with the layout rule shown in FIG. 9. The multi-screen is displayed for a predetermined period of time. In the case of the normal automatic multi-play, since an image is cut out irrespective of whether it includes a face or not, as shown in FIG. 10A, a face may be cut depending on the face position or the cutout area.

On the other hand, if it is determined that face information is recorded in a tag of the image file of the original image at step S30, then the image of a face area including the face image is cut out in accordance with information about a face frame area and the aspect ratio of the divided area on the multi-screen in which the image is to be arranged (step S34). The cut out image is arranged in a divided area on the screen (multi-screen) of the liquid crystal monitor 30 in accordance with the layout rule, and the multi-screen is displayed for a predetermined period of time (step S36).

The cut out image of the face area is usually displayed in an enlarged state (see FIGS. 8(1) to 8(3)) though it depends on the size of the face in the original image (see FIG. 6). Furthermore, when the image of the face area is cut out and displayed, the image is rotated so that the face image is positioned in a normal direction, on the basis of the face inclination angle included in the face information.

Subsequently, it is determined whether or not the number of displays corresponding to the number of faces (including one face) existing in the original image of one frame have been shown (step S38). If the number of displays corresponding to the number of faces have not been shown yet, then the flow returns to step S34, and the processings of steps S34 to step S38 are repeated the number of times corresponding to the number of faces. In the case where there are multiple faces, it is possible to determine the order of displaying the multiple faces, and cut out and display the face areas in accordance with the determined display order, similarly to the case of the automatic face play described above.

Subsequently, when the number of displays corresponding to the number of faces (including one face) have been shown, it is determined whether or not to continue the automatic multi-play (step S40). At step S40, the operation of the DISP/BACK button 44 is monitored, and, if the DISP/BACK button 44 is on during the automatic multi-play, the automatic multi-play is ended.

If the automatic multi-play continues, the next frame (an image with an image-taking time and date later than that of the image arranged on the multi-screen last) is set to be the original image from which an image is to be, and the flow returns to step S30 (step S42). If the image being reproduced currently is the image with the latest image-taking time and date, the image with the oldest image-taking time and date is set.

As shown in FIG. 8, by the automatic multi-play processing operation described above, cut out images are arranged on the multi-screen of the liquid crystal monitor 30 in accordance with the layout rule, and the updated multi-screen is sequentially displayed.

The example in FIG. 8 shows the case where the automatic multi-play is performed on the basis of three original images (a person or persons are shown on each of the original images as shown in FIG. 6).

That is, the image of a face area is cut out from the first original image and arranged on the left side of the multi-screen (1). Subsequently, the image of a face area is cut out from the second original image and arranged on the right side of the multi-screen (1). Next, the image of the face area of the person in the center is cut out from the third original image and arranged at the upper left of the multi-screen (2). In this way, the cut out images are sequentially arranged in the divided areas of the multi-screen in accordance with the layout rule shown in FIG. 9 to update the multi-screen.

Figure 10B:

In the automatic multi-play of this embodiment, if there are multiple faces, the image of the face area is cut out for each face. However, it is possible to determine the cutout range so that all the face images are cut out and cut out the image of the face areas, as shown in FIG. 10B. In this case, it is desirable to select any optimum one of the aspect ratios of the divided areas of the multiple-screen as the aspect ratio of the cutout range.

It is also possible to determine whether the original image is a vertically long image taken by a camera turned sideways or a horizontally long image taken by a camera positioned erect and determine the cutout range depending on whether a vertically long image or a horizontally long image. Whether the original image is a vertically long image taken by a camera turned sideways or a horizontally long image taken by a camera positioned erect can be determined on the basis of the face inclination angle included in face information.

Figure 10C:
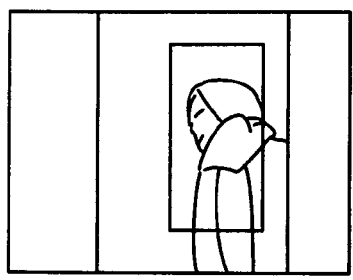

FIG. 10C shows an example of the cutout range in the case of cutting out the image of a face area from an original image taken by a camera turned sideways (vertically long image). In this way, the image of a vertically long face area is cut out in the case of a vertically long original image, and the image of a horizontally long face area is cut out in the case of a horizontally long original image. The images of the face areas cut out in this way are arranged in a vertically long divided area like that of the multi-screen (1) shown in FIG. 11 or a horizontally long divided area like that of the multi-screen (2). The images may be arranged on the multi-screen having a vertically long divided area or a horizontally long divided area among the multi-screens shown in FIG. 9.

In this embodiment, from an image taken under the face image taking mode (such an image that face information is recorded in a tag of the image file), the image of a face area is cut out to reproduce the face by the automatic face play or the automatic multi-play. However, this is not limiting. It is also possible to analyze an image to be automatically reproduced to acquire face information, during the automatic face play or the automatic multi-play. In this case, even in the case of an image taken by a camera which is not equipped with the face image taking mode, the automatic face play and the automatic multi-play according to the present invention are possible.

In this embodiment, the automatic reproduction function has been described as that of a digital camera. However, this is not limiting. The present invention can be applied to any device equipped with an image reproduction function, such as a camera-equipped mobile phone, a portable information terminal (PDA) and a personal computer.

What is claimed is:

1. An automatic reproduction method for automatically sequentially reproducing images cut out from multiple original images, wherein a multi-screen is updated by sequentially arranging the cut out images in multiple divided areas obtained by dividing the multi-screen, the method comprising the steps of:

determining, when cutting out an image to be reproduced from the original image, whether or not the original image is an image including a face image of a person;

if it is determined that the original image is an image including a face image of a person, cutting out the image of a face area including the face image from the original image, and, if it is determined that the original image is an image which does not include a face image of a person, cutting out the image of a predetermined area to be cut out; and arranging the cut out image in the divided area of the multi-screen;

wherein the arranging the cut out image comprises arranging one or more cut out images in a first type of multi-screen and subsequently arranging one or more cut out images in a second type of multi-screen, wherein the first type of multi-screen and the second type of multi-screen have at least one of a different number of divided areas and different aspect ratios.

2. The automatic reproduction method according to claim 1, wherein, if the original image is an image including face images of multiple persons, the respective images of face areas including the face images are cut out from the original image and then the cut out images of the multiple face areas are sequentially arranged in the divided areas of the multi-screen.

3. The automatic reproduction method according to claim 2, wherein, at the time of sequentially arranging the images of the multiple face areas in the divided areas of the multi-screen, the arrangement order is determined on the basis of at least one piece of information among the face image size, the degree of possibility of being a face and the face position.

4. The automatic reproduction method according to claim 2, further comprising the step of selecting any information from among the face image size, the degree of possibility of being a face and the face position, wherein at the time of sequentially arranging the images of the multiple face areas in the divided areas of the multi-screen, the arrangement order is determined on the basis of the selected information.

5. The automatic reproduction method according to claim 1, further comprising the step of acquiring the inclination angle of the face image, wherein at the time of arranging the cut out image of the face area in the divided area of the multi-screen, the image is rotated so that the face image is positioned in a normal direction, on the basis of the acquired inclination angle.

6. The automatic reproduction method according to claim 4, further comprising the step of acquiring the inclination angle of the face image, wherein at the time of arranging the cut out image of the face area in the divided area of the multi-screen, the image is rotated so that the face image is positioned in a normal direction, on the basis of the acquired inclination angle.

7. The automatic reproduction method according to claim 5, further comprising the step of determining whether the original image is a vertically long image taken by a camera turned sideways or a horizontally long image taken by a camera positioned erect, wherein if the original image is a vertically long image, the image of a vertically long face area is cut out from the original image, and, if the original image is a horizontally long image, the image of a horizontally long face area is cut out from the original image; and the cut out image of the vertically long face area is arranged in a vertically long divided area of the multi-screen, and the cut out image of the horizontally long face area is arranged in a horizontally long divided area of the multi-screen.

8. An automatic reproduction apparatus comprising a function of automatically sequentially reproducing images cut out from multiple original images, the function being an automatic multi-play function of updating a multi-screen by sequentially arranging the cut out images in multiple divided areas obtained by dividing the multi-screen, the apparatus comprising:

a reading device which reads an original image to be automatically reproduced from a storage device in which multiple original images are stored;

a determination device which determines whether or not the read original image is an image including a face image of a person;

a trimming device which, if it is determined that the original image is an image including a face image of a person, cuts out the image of a face area including the face image from the original image, and, if it is determined that the original image is an image which does not include a face image of a person, cuts out the image of a predetermined area to be cut out;

an image display device which displays the multi-screen; and an image update device which updates the multi-screen by arranging the images cut out by the trimming device in divided areas of the multi-screen;

wherein the update device arranges one or more cut out images in a first type of multi-screen and subsequently arranging one or more cut out images in a second type of multi-screen, wherein the first type of multi-screen and the second type of multi-screen have at least one of a different number of divided areas and different aspect ratios.

9. The automatic reproduction apparatus according to claim 8, wherein if the original image is an image including face images of multiple persons, the trimming device cuts out the respective images of face areas including the face images, and the image update device sequentially arranges the cut out images of the multiple face areas in the divided areas of the multi-screen.

10. The automatic reproduction apparatus according to claim 9, wherein, at the time of sequentially arranging the images of the multiple face areas cut out from the original image in the divided areas of the multi-screen, the image update device determines the arrangement order on the basis of at least one piece of information among the face image size, the degree of possibility of being a face and the face position.

11. The automatic reproduction apparatus according to claim 9, further comprising a selection device which selects any information from among the face image size, the degree of possibility of being a face and the face position, wherein at the time of sequentially arranging the images of the multiple face areas cut out from the original image in the divided areas of the multi-screen, the image update device determines the arrangement order on the basis of the information selected by the selection device.

\* \* \* \* \*